United States Patent
Mead et al.

(10) Patent No.: US 6,325,844 B1
(45) Date of Patent: Dec. 4, 2001

(54) FILTER AND MUFFLER DEVICE FOR VACUUM MECHANISM

(75) Inventors: Donald R. Mead; William S. Lindsay, both of Jupiter, FL (US)

(73) Assignee: Florida Pneumatic Manufacturing Corporation, Jupiter, FL (US)

( * ) Notice: Subject to any disclaimer, the term of this patent is extended or adjusted under 35 U.S.C. 154(b) by 0 days.

(21) Appl. No.: 09/583,556

(22) Filed: May 31, 2000

(51) Int. Cl.$^7$ .................................................. B01D 46/00
(52) U.S. Cl. ................. 96/384; 96/385; 55/467; 55/DIG. 3
(58) Field of Search ............... 96/380, 384, 385, 96/388, FOR 172; 55/385.3, 385.1, 356, 467, 472, 473, DIG. 3, 482, 320, 324, 334, 335, 332

(56) References Cited

U.S. PATENT DOCUMENTS

| | | | |
|---|---|---|---|
| 1,100,575 | * | 6/1914 | Kirby . |
| 2,155,669 | * | 4/1939 | Lofgren . |
| 2,400,558 | * | 5/1946 | Lindberg . |
| 2,757,753 | * | 8/1956 | Kasper . |
| 3,218,783 | * | 11/1965 | Ripple . |
| 3,344,588 | * | 10/1967 | Szabo . |
| 3,353,338 | * | 11/1967 | Nilsson . |
| 4,280,245 | * | 7/1981 | Hiester . |
| 4,330,899 | * | 5/1982 | Miller et al. . |
| 4,418,443 | * | 12/1983 | Fischer . |
| 4,424,883 | * | 1/1984 | Musiani . |
| 4,547,206 | * | 10/1985 | Sovis et al. . |
| 4,613,348 | | 9/1986 | Natale . |
| 4,651,380 | * | 3/1987 | Ogden . |
| 4,723,971 | * | 2/1988 | Caldas . |
| 4,726,825 | | 2/1988 | Natale . |
| 4,929,261 | | 5/1990 | Jacobson . |
| 4,970,753 | * | 11/1990 | Herron, Jr. . |
| 5,069,696 | | 12/1991 | Bruno, III . |
| 5,096,472 | | 3/1992 | Perry . |
| 5,155,876 | * | 10/1992 | Whitaker . |
| 5,159,738 | * | 11/1992 | Sunagawa et al. . |
| 5,273,561 | | 12/1993 | Zeren . |
| 5,301,388 | | 4/1994 | Zeren . |

* cited by examiner

Primary Examiner—Duane S. Smith
(74) Attorney, Agent, or Firm—Larson & Taylor PLC

(57) ABSTRACT

A filter and muffler device for use with a vacuum mechanism having an outlet port is particularly designed to muffle sound exiting from the outlet port as well as to filter the outlet exhaust. The device includes a filter element which is generally rectangular in plan view and which has opposed lateral sides and opposed longitudinal sides. The filter element has a direction of filtration from a planar bottom to a planar top thereof, and is preferably a HEPA type filter. The device also includes a housing in which the filter element is located. This housing includes a generally flat upper wall parallel to and spaced from the top of the filter element; respective lateral and longitudinal side walls connected to the upper wall and extending generally parallel to the respective lateral and longitudinal sides of the filter element; and a lower wall spaced from the upper wall, extending between the lateral and longitudinal side walls of the housing, and located opposite the bottom of the filter element. This lower wall has a lateral peak which produces a trochoidal shape so that the lower wall includes a major surface and a minor surface. The housing further includes an inlet port extending outwardly from the minor surface which is adapted to be mounted to the outlet port of the vacuum device, a mounting mechanism for mounting the filter element sealingly between the upper wall and the lower wall, and spaced exhaust ports located adjacent the upper wall.

21 Claims, 3 Drawing Sheets

FILTER AND MUFFLER DEVICE FOR VACUUM MECHANISM

FIELD OF THE INVENTION

The present invention relates generally to a filter for mechanisms which vacuum, and more particularly to a filter and muffler device which is externally attached to an outlet port of a vacuum mechanism to reduce particulates or duct particles escaping from the outlet port and additionally to reduce noise emanating from the outlet port.

BACKGROUND OF THE INVENTION

The use of HEPA filters in a vacuum device, such as wet/dry vacuums, is known in the art. In addition, the use of separately attachable filter to an exhaust of a vacuum is also known. However, while such separately attachable filters may act to muffle sound, they do not do so efficiently or effectively.

BRIEF SUMMARY OF THE INVENTION

In accordance with the present invention, a filter and muffler device for use with a vacuum mechanism having an outlet port is provided. The filter and muffler device is particularly designed to muffle sound exiting from the outlet port as well as to filter the exhaust of the vacuum mechanism. The device includes a filter element which is generally rectangular in plan view and which has opposed lateral sides and opposed longitudinal sides. The filter element has a direction of filtration from a planar inlet side or bottom to a planar outlet side or top thereof, and is preferably a HEPA type filter.

The device also includes a housing in which the filter element is located. This housing includes a generally flat upper wall parallel to and spaced from the top of the filter element; respective lateral and longitudinal side walls connected to the upper wall and extending generally parallel to the respective lateral and longitudinal sides of the filter element; and a lower wall spaced from the upper wall, extending between the lateral and longitudinal side walls of the housing, and located opposite the bottom of the filter element. This lower wall has a lateral peak which produces a trochoidal shape so that the lower wall includes a major surface and a minor surface. The housing also includes an inlet port extending outwardly from the minor surface of the lower wall which is adapted to be mounted to the outlet port of the vacuum device, a mounting means for mounting the filter element sealingly between the upper wall and the lower wall, and spaced exhaust ports located adjacent the upper wall.

In a preferred embodiment, the filter and muffler device further includes a middle baffle provided between the longitudinal side walls of the housing and between the planar top of the filter element and the upper wall of the housing. The middle baffle preferably contacts the top of the filter element at a lateral center thereof and extends to the longitudinal sides of the housing from the lateral center at an acute angle to the upper all so that a small passage underneath the middle baffle is provided. The middle baffle also preferably includes a lateral passage therethrough adjacent one of the longitudinal sides of the housing.

In the preferred embodiment, the exhaust ports of the housing include (a) a first lateral exhaust opening located adjacent an intersection of the upper wall and the lateral side wall which is adjacent the minor surface of the lower wall, (b) a second lateral exhaust opening located adjacent an intersection of the upper wall and the lateral side wall which is adjacent the major surface of the lower wall, and (c) third and fourth exhaust openings located adjacent an intersection of the upper wall and a first one of the longitudinal side walls. Preferably, the respective intersections of the upper wall and the lateral side walls are curved, and the device further includes respective first and second end baffles extending inwardly from each respective lateral wall underneath of the respective first and second openings. In addition, an intersection of the upper wall and a second one of the longitudinal side walls is unbroken with any openings. For best sound muffling, the inlet port of the housing is located offset from a lateral center of the minor surface and towards the second one of the longitudinal side walls of the housing, such as being offset by about 12–20% of a width of the housing. The inlet port is also tapered inwardly toward a distal end thereof so as to be adapted to provide a friction fit with outlet ports of vacuum devices of various sizes.

Also in the preferred embodiment, the major surface of the lower wall extends at an angle of 14–18° to the upper wall, and the minor surface of the lower wall extends at an angle of 6–10° to the upper wall. In addition, the longitudinal side walls include respective lower ledges extending inwardly therefrom which respectively engage the planar bottom of the filter element to locate the filter element thereon.

It is an advantage of the present invention that an effective filtering and muffling is achieved in a single device.

It is also an advantage of the present invention that the device is usable on a variety of vacuum devices as an easily installed add-on.

It is another advantage of the present invention that the device is specifically designed to reduce acoustic levels in the 2,000–8,000 Hz range which is the most audible to the human ear.

Other features and advantages of the present invention are stated in or apparent from a detailed description of a presently preferred embodiment of the invention found hereinbelow.

DETAILED DESCRIPTION OF THE INVENTION

Figure 1:
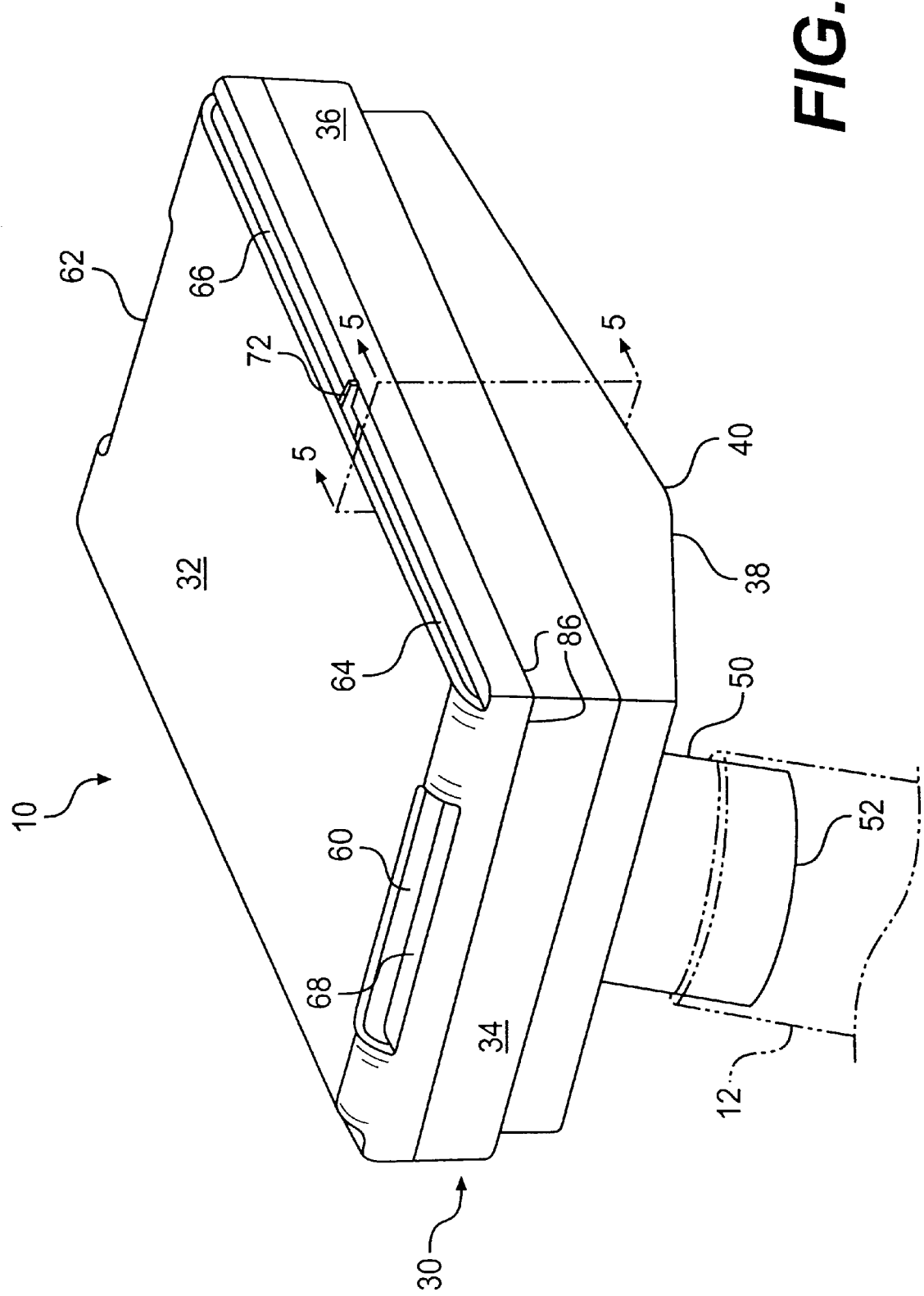
FIG. 1 is a top, front and right side perspective view of the filter and muffler device of the present invention.
Figure 2:
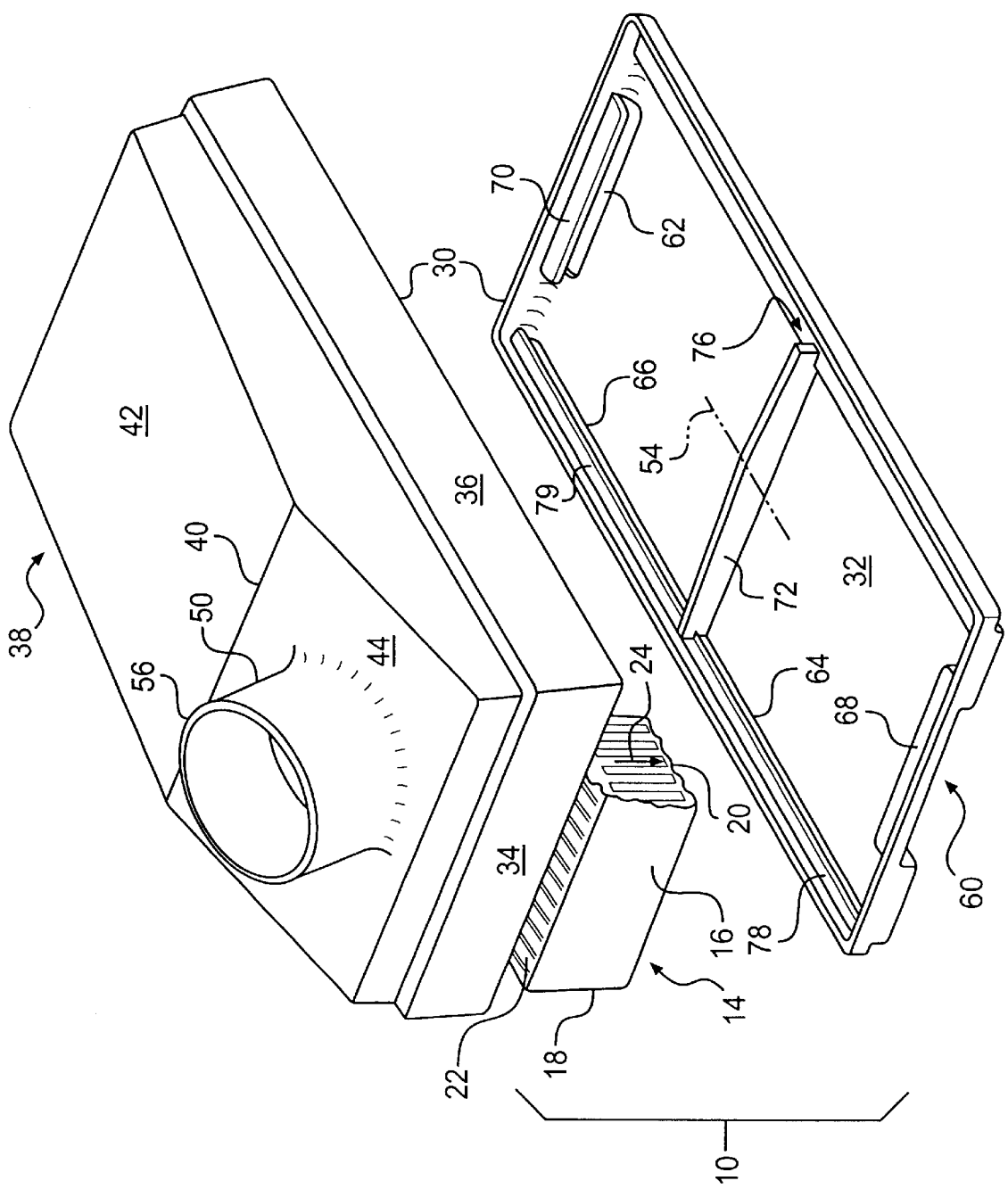
FIG. 2 is a bottom, front and left side exploded perspective view of the device depicted in FIG. 1.
Figure 3:
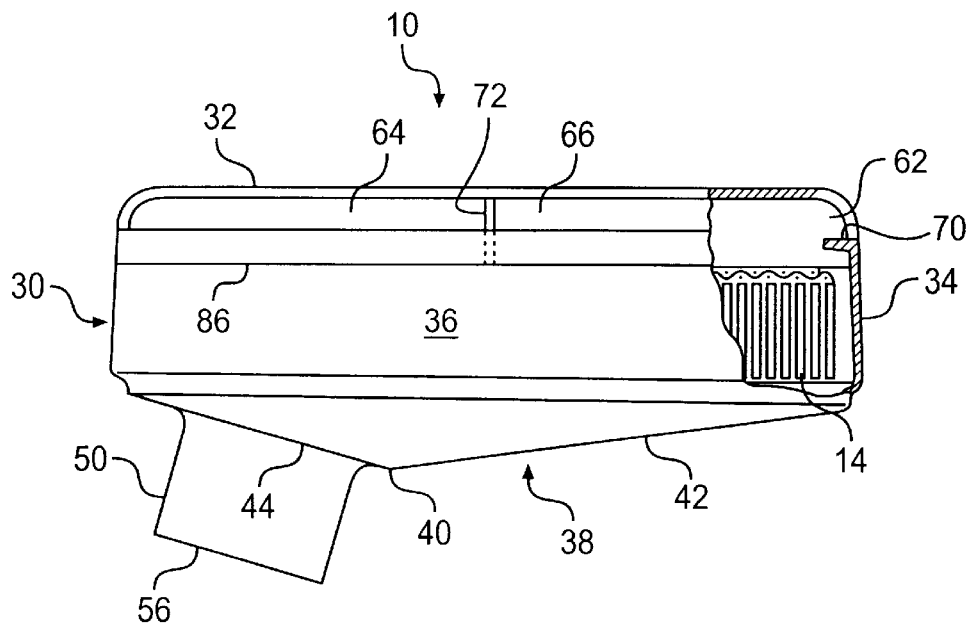
FIG. 3 is a partially cut-away right side view of the device depicted in FIG. 1.
Figure 4:
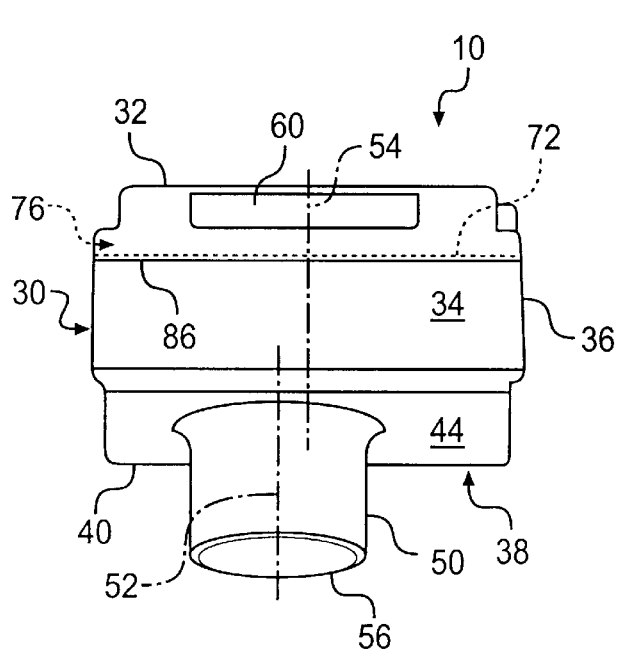
FIG. 4 is a front view of the device depicted in FIG. 1.

With reference now to the drawings in which like numerals represent like elements throughout the views, a filter and muffler device 10 is shown in FIGS. 1–5 which is designed for use with a vacuum mechanism having an outlet port 12. Typical of such vacuum mechanisms are wet/dry vacuums, which are known to produce a lot of noise. Such wet/dry vacuums generally have a more or less horizontally upwardly directed outlet port. However, for convenience, the present device 10 will be described hereafter as oriented on a more or less upwardly or vertically directed outlet port, and thus device 10 has an up/down direction consistent with the depiction thereof in FIGS. 1–5. It will be appreciated that the use of such an up/down direction is for convenience only, and that the device of the present invention may be mounted in any direction or orientation as necessary.

Device 10 includes a filter element 14 which is preferably a HEPA type filter formed of pleated filtering material joined (glued) periodically together (0.3 micron @ 99.97% efficiency). Filter element 10 also includes a top expanded aluminum (or suitable metal) screen for reinforcement, paper sides, and an otherwise open bottom as typical in the art. The HEPA filter element 14 of the present invention is used to filter very small particulates or dust particles from the exhaust of outlet port 12 which are not otherwise filtered by the filter typically provided as an interior part of the vacuum mechanism located upstream from the exhaust outlet port. Filter element 14 is generally shaped as a rectangular box, and thus has a rectangular profile in plan view with opposed lateral sides 16, opposed longitudinal sides 18, a planar top 20, a planar bottom 22, and a direction of filtration 24 from planar bottom 24 to planar top 22.

Device 10 also includes a housing 30 in which filter element 14 is located. Housing 30 is designed with various asymmetrical spaces, exhaust openings and baffles as discussed hereafter in order to reduce the noise which emanates from outlet port 12 of the vacuum mechanism over and above that very minor amount which would be inherent merely by the passage of the noise through filter element 14. Broadly, housing 30 includes (a) a generally flat upper wall 32 parallel to and spaced from top 20 of filter element 14, (b) respective lateral side walls 34 and respective longitudinal side walls 36 integrally connected to upper wall 32 and extending generally parallel to respective lateral sides 16 and longitudinal sides 18 of filter element 14, and (c) a lower wall 38 spaced from upper wall 32 and integrally formed with and extending between lateral side walls 34 and longitudinal side walls 36. Lower wall 38 is located opposite to and spaced from bottom 22 of filter element 14, and lower wall 38 includes a lateral peak 40 extending between longitudinal side walls 36 so that lower wall 38 is not parallel to bottom 22. Instead, with lateral peak 40 which is adjacent one lateral side wall 34 (so that lateral peak 40 is not symmetrically located), lower wall 38 is divided into a major surface 42 and a minor surface 44 and provides housing 30 with a broadly trochoidal shape. Preferably, major surface 42 extends at an angle of 14–18° to upper wall 32, while minor surface 44 extends at an angle of 6–10° to upper wall 32.

Housing 30 also includes an inlet port 50 integral with and extending away from minor surface 44 of lower wall 38. It will be noted that a longitudinal center 52 of inlet port 50 is located offset from a lateral center 54 of minor surface 44 and towards one of lateral sides 34, so that inlet port 50 is not symmetrically located on minor surface 44. The amount of offset is preferably about 12–20% of a width of housing 30. Inlet port 50 is also tapered slightly inwardly toward a free or distal end 56 thereof. This tapering is designed to provide a friction fit of inlet port 50 within outlet ports 12 of various sizes typically provided on vacuum mechanisms.

Provided adjacent upper wall 32 and above filter element 14 are (a) a first exhaust opening 60 located adjacent an intersection of upper wall 32 and lateral side wall 34 which is adjacent minor surface 44, and (b) a second exhaust opening 62 located adjacent an intersection of upper wall 32 and lateral side wall 34 which is adjacent major surface 42. Also provided adjacent upper 32 wall and above filter element 14 are third and fourth exhaust openings 64 and 66 located adjacent an intersection of upper wall 32 and longitudinal side wall 36 located on the opposite side of lateral center 54 from longitudinal center 52 of inlet port 50. It will be noted that the respective intersections of upper wall 32 and lateral side walls 34 are curved, so that no sharp angles are created in the flow space. In addition, extending from each respective lateral wall 34 underneath of the respective first and second openings 60 and 62 are respective first and second end baffles 68 and 70 which extend inwardly about the same distance as openings 60 and 62 extend inwardly along upper wall 32. It will also be noted that the intersection of upper wall 32 and the other longitudinal side wall 36 opposite third and fourth exhaust openings 64 and 66 is unbroken with any openings, so that the lateral flow of housing 30 (through third and fourth exhaust openings 64 and 66) is asymmetrical.

Provided between and integrally formed with longitudinal side walls 36 and upper wall 32 of housing 30 is a middle baffle 72. It will be appreciated that middle baffle 72 contacts top 20 of filter element 14 at a lateral center thereof, and extends in opposite directions to respective longitudinal sides 36 of housing 30 from the lateral center at an acute angle to upper wall 32 (see the phantom depiction in FIG. 4). Due to this acute angle, middle baffle 72 provides small angle-shaped passages 74 between filter element 14 and the bottom edge of middle baffle 72. It will also be appreciated that middle baffle 72 also includes a small lateral passage 76 therethrough adjacent the other longitudinal side wall 36 opposite third and fourth exhaust openings 64 and 66 producing another asymmetrical flow pattern. In addition, extending from longitudinal side wall 36 underneath of the respective third and fourth openings 64 and 66 are respective third and fourth side baffles 78 and 79 which extend inwardly about the same distance as openings 64 and 66 extend inwardly along upper wall 32.

Filter element 14 is mounted housing 30 by a suitable mounting means which mounts filter element 14 between, but spaced from, upper wall 32 and lower wall 38. In this preferred embodiment, the mounting means includes respective lower edges 80 extending along and inwardly from longitudinal sides 36 (as shown for one side in FIG. 5). Lower edges 80 respectively engage adjacent edges of planar bottom 22 of filter element 14 to locate filter element 14 thereon when housing 30 is assembled. After assembly, it will be appreciated that filter element 14 is held to lower edges 46 by a bead of glue 82 applied during the assembly process. The mounting means also includes another bead of glue 84 provided during the assembly process around the top peripheral edge of filter element 14 which binds to the adjacent portions of lateral side walls 34 and longitudinal side walls 36. It will also be appreciated that top 20 of filter element 14 is contacted at the lateral and longitudinal center thereof by middle baffle 72 in order to prevent filter element 14 from bowing upward due to the force of the exhaust air passing therethrough, so that middle baffle 72 also acts in this respect as part of the mounting means where necessary.

Figure 5:
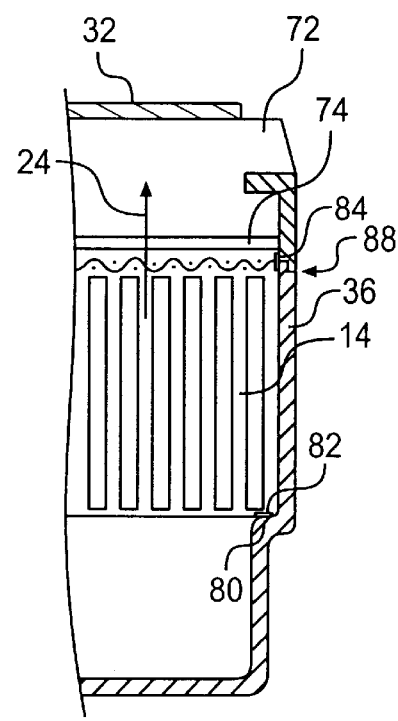
FIG. 5 is a front section view of the portion of the device identified with section lines 5 in FIG. 1.

In this preferred embodiment, housing 30 is formed in two halves along a mating line 86. The two halves have mating stepped edges 88 as shown in FIG. 5. From the position of mating line 86 in FIG. 5, it will be appreciated that when glue 84 is applied to the peripheral edge of filter element 14, some of glue 84 is designed to run into the area of mating edges 88 to glue mating edges 88 together as device 10 is assembled.

With device 10 of the present invention, the various passages, openings and baffles reduce the acoustic level of sound in the 2,000–8,000 Hz frequency range which is the most audible to the human ear. These reductions are achieved by breaking up the laminar flow and creating a turbulent frequency canceling effect throughout much of the frequency range that is damaging or annoying to the human ear. Additionally, filter element 14 also provides acoustic polishing qualities, while providing only a minimal air pressure drop. Middle baffle 72 interrupts flow to the exhaust openings and baffles 68 and 70 immediately adjacent exhaust openings 60 and 62 to interrupt flow one last time and hence to prevent whistling. In tests, a reduction of noise levels of 6–12 dba (10 dba is a 90% drop) in acoustic power level was found using SEARS® wet/dry vacuums were achieved.

While the present invention has been described with respect to an exemplary embodiment thereof, it will be understood by those of ordinary skill in the art that variations and modifications can be effected within the scope and spirit of the invention.

What is claimed is:

1. A filter and muffler device for a vacuum mechanism having an outlet port comprising:
    a filter element which is generally rectangular in plan view and having opposed lateral sides, opposed longitudinal sides, and a direction of filtration from a planar bottom to a planar top thereof; and
    a housing in which said filter element is located, said housing including
        a) a generally flat upper wall parallel to and spaced from the top of said filter to element,
        b) respective lateral and longitudinal side walls connected to said upper wall and extending generally parallel to the respective lateral and longitudinal sides of said filter element,
        c) a lower wall spaced from said upper wall, extending between said lateral and longitudinal side walls of said housing, and located opposite said bottom of said filter element, said lower wall having a lateral peak so that said lower wall includes a major surface and a minor surface,
        d) an inlet port extending outwardly from the minor surface of said lower wall which is adapted to be mounted to the outlet port of the vacuum device,
        e) a mounting means for mounting said filter element sealingly between said upper wall and said lower wall, and
        f) spaced exhaust ports located adjacent said upper wall.

2. A filter and muffler device as claimed in claim 1, and further including a middle baffle provided between said longitudinal side walls of said housing and between said planar top of said filter element and said upper wall of said housing.

3. A filter and muffler device as claimed in claim 2, wherein said middle baffle contacts said top of said filter element at a lateral center thereof and extends to the longitudinal sides of said housing from the lateral center at an acute angle to said upper wall so that a small passage underneath said middle baffle is provided.

4. A filter and muffler device as claimed in claim 3, wherein said middle baffle also includes a lateral passage therethrough adjacent one of said longitudinal sides of said housing.

5. A filter and muffler device as claimed in claim 1, wherein said exhaust ports include:
    a first exhaust opening located adjacent an intersection of said upper wall and said lateral side wall which is adjacent said minor surface of said lower wall,
    a second exhaust opening located adjacent an intersection of said upper wall and said lateral side wall which is adjacent said major surface of said lower wall, and
    third and fourth exhaust openings located adjacent an intersection of said upper wall and a first one of said longitudinal side walls.

6. A filter and muffler device as claimed in claim 5:
    wherein the respective intersections of said upper wall and said lateral side walls are curved; and
    further including respective first and second end baffles extending inwardly from each respective said lateral wall underneath of the respective said first and second openings.

7. A filter and muffler device as claimed in claim 5, wherein an intersection of said upper wall and a second one of said longitudinal side walls is unbroken with any openings.

8. A filter and muffler device as claimed in claim 7, wherein said inlet port of said housing is located offset from a lateral center of said minor surface and towards the second one of said longitudinal side walls of said housing.

9. A filter and muffler device as claimed in claim 8, wherein said inlet port is offset about 12–20% of a width of said housing.

10. A filter and muffler device as claimed in claim 8, wherein said inlet port is tapered inwardly toward a distal end thereof so as to be adapted to provide a friction fit with outlet ports of vacuum devices of various sizes.

11. A filter and muffler device as claimed in claim 1, wherein said major surface of said lower wall extends at an angle of 14–18° to said upper wall, and said minor surface of said lower wall extends at an angle of 6–10° to said upper wall.

12. A filter and muffler device as claimed in claim 1, wherein mounting means includes respective lower ledges extending inwardly from said longitudinal side walls which respectively engage said planar bottom of said filter element to locate said filter element thereon.

13. A filter and muffler device for a vacuum mechanism having an outlet port comprising:
    a filter element which is generally rectangular in plan view and having opposed lateral sides, opposed longitudinal sides, and a direction of filtration from a planar bottom to a planar top thereof; and
    a housing in which said filter element is located, said housing including
        a) a generally flat upper wall parallel to and spaced from the top of said filter element,
        b) respective lateral and longitudinal side walls connected to said upper wall and extending generally parallel to the respective lateral and longitudinal sides of said filter element,
        c) a lower wall spaced from said upper wall, extending between said lateral and longitudinal side walls of said housing, and located opposite said bottom of said filter element, said lower wall having a lateral peak so that said lower wall includes a major surface and a minor surface,
        d) an inlet port extending outwardly from the minor surface of said lower wall which is adapted to be mounted to the outlet port of the vacuum device, said inlet port being offset from a lateral center of said minor surface,
        e) a mounting means for mounting said filter element sealingly between said upper wall and said lower wall, and
        f) spaced exhaust ports located above said filter element.

14. A filter and muffler device as claimed in claim 13, wherein said exhaust ports include:

a first lateral exhaust opening located adjacent an intersection of said upper wall and said lateral side wall which is adjacent said minor surface of said lower wall, a second lateral exhaust opening located adjacent an intersection of said upper wall and said lateral side wall which is adjacent said major surface of said lower wall, and third and fourth exhaust openings located adjacent an intersection of said upper wall and a first one of said longitudinal side walls.

15. A filter and muffler device as claimed in claim 14:

wherein the respective intersections of said upper wall and said lateral side walls is curved; and further including respective first and second end baffles extending inwardly from each respective said lateral wall underneath of the respective said first and second openings.

16. A filter and muffler device as claimed in claim 15, wherein an intersection of said upper wall and a second one of said longitudinal side walls is unbroken with any openings.

17. A filter and muffler device as claimed in claim 16, wherein said inlet port is offset about 12–20% of a width of said housing.

18. A filter and muffler device as claimed in claim 17, wherein said major surface of said lower wall extends at an angle of 14–18° to said upper wall, and minor surface of said lower wall extends at an angle of 6–10° to said upper wall.

19. A filter and muffler device as claimed in claim 16, and further including a middle baffle provided between said longitudinal side walls of said housing and between said planar top of said filter element and said upper wall of said housing.

20. A filter and muffler device as claimed in claim 19:

wherein said middle baffle contacts said upper wall of said filter element at a lateral center thereof and extends to the longitudinal sides of said housing from the lateral center at an acute angle to said upper wall so that a small passage underneath said middle baffle is provided; and wherein said middle baffle also includes a lateral passage therethrough adjacent one of said longitudinal sides of said housing.

21. A filter and muffler device as claimed in claim 20, wherein mounting means includes respective lower ledges extending inwardly from said longitudinal side walls which respectively engage said planar bottom of said filter element to locate said filter element thereon.

* * * * *